United States Patent [19]

Lewis

[11] Patent Number: 4,902,182
[45] Date of Patent: Feb. 20, 1990

[54] PUSH-IN FASTENER

[75] Inventor: Jeffrey C. Lewis, Hubbardston, Mass.

[73] Assignee: TRW Inc., Cleveland, Ohio

[21] Appl. No.: 254,405

[22] Filed: Oct. 6, 1988

[51] Int. Cl.$^4$ .............................................. F16B 19/00
[52] U.S. Cl. ...................................... 411/510; 411/913
[58] Field of Search ................................ 411/508–510, 411/512, 913, 907, 908, 340–342; 24/93, 297, 30.5 P, 17 AP

[56] References Cited

U.S. PATENT DOCUMENTS

| 3,483,787 | 12/1964 | Saunders. | |
|---|---|---|---|
| 3,494,244 | 2/1970 | Wayland. | |
| 3,722,037 | 3/1973 | Jaeger | 411/908 |
| 3,810,279 | 5/1974 | Swick et al. | |
| 4,240,183 | 12/1980 | Sumimoto et al. | 24/30.5 P |
| 4,381,633 | 5/1983 | MacLeod. | |
| 4,396,329 | 8/1983 | Wollar. | |

4,728,238 3/1988 Chisholm et al. .

FOREIGN PATENT DOCUMENTS 64768 5/1982 European Pat. Off. .............. 411/60

Primary Examiner—Neill R. Wilson
Attorney, Agent, or Firm—Fay, Sharpe, Beall, Fagan, Minnich & McKee

[57] ABSTRACT

A one piece plastic push-in fastener for insertion into a preformed opening in a workpiece comprises an axially elongated rigid shank having a head end and a free end. A series of flexible wing members extend laterally from the shank to a radial extent greater than the cross-section of the opening. The wing members flex toward the head to permit push-in installation of the fastener in the opening. However, abutment stops are located between adjacent wing members to prevent their flexure toward the free end. Thus, the fastener has low resistance to installation and high resistance to removal.

2 Claims, 2 Drawing Sheets

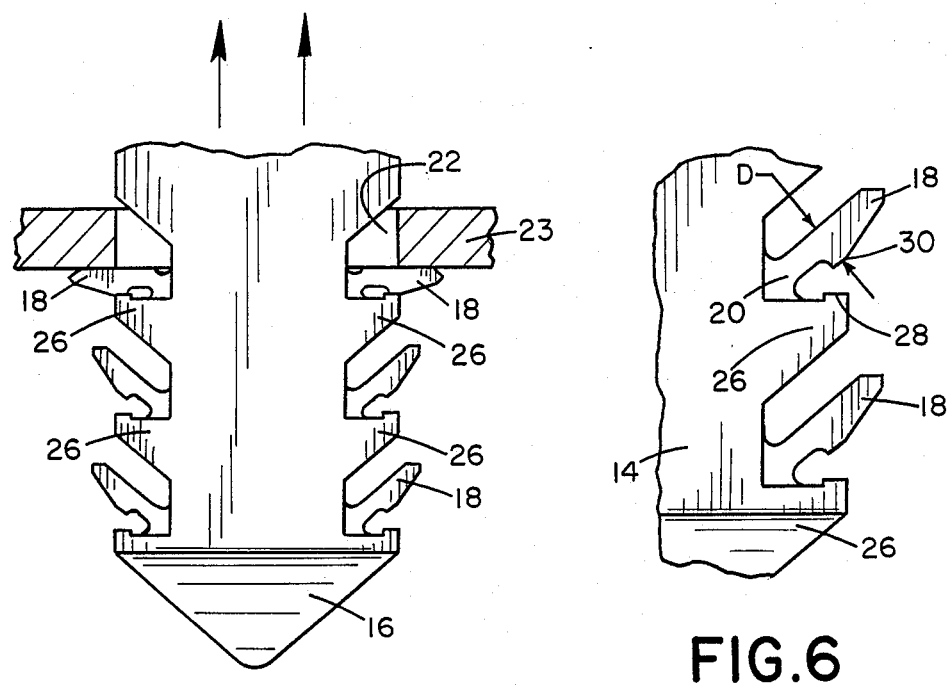
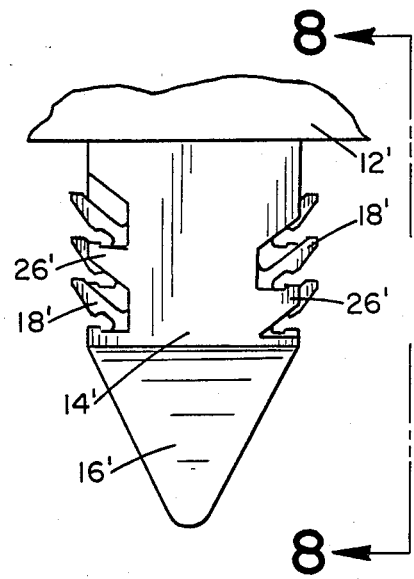
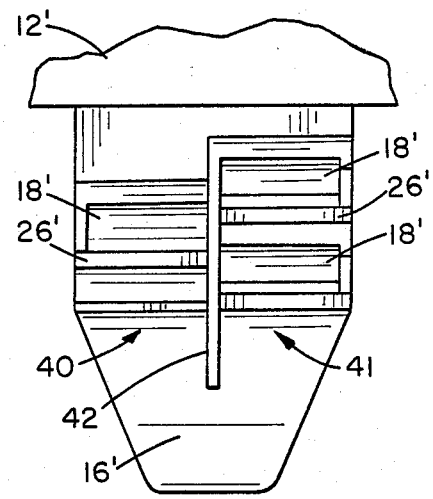
FIG. 5
FIG. 6
FIG. 7
FIG. 8

PUSH-IN FASTENER

BACKGROUND OF THE INVENTION

The subject invention is directed toward the fastener art and, more particularly, to a fastener of the type generally referred to as a "push-in" or "drive" fastener.

"Push-in" or "drive" fasteners of a variety of types and styles are well known in the art. Typically, as shown in U.S. Pat. Nos. 4,396,329 and 4,728,238 they are arranged to be driven axially into preformed openings in a work piece and to engage therein by virtue of laterally extending flexible tabs or wing-like members.

An ongoing problem with such fasteners has been the relationship between the installation or insertion forces and the removal forces. Ideally, it would be desirable in many situations to have a design wherein the insertion forces are extremely low and the removal forces extremely high. With the prior art designs, however, these forces were generally nearly equal. Attempts to reduce the forces resisting installation while increasing the forces resisting removal have typically involved changing the shape of the tabs, their angle of inclination, or their manner of connection to the fastener shank. These changes have generally been of marginal value.

SUMMARY OF THE INVENTION

The subject invention overcomes the noted problem and provides a push-in fastener wherein the removal force can be many times greater than the insertion forces.

Specifically, and in accordance with a preferred embodiment, the invention comprise a one-piece, molded plastic fastener intended for use in a preformed opening in a workpiece. The fastener includes a head portion with a rigid axially elongated shank extending therefrom and terminating in a free end portion. The cross-section of the shank in planes perpendicular to the axis is of a size to be freely received in the workpiece opening. At least one wing member extends laterally from the shank and is connected thereto by means permitting flexure of the wing member in directions axially of the shank. Located between the wing member and the head portion is stop means for engaging the wing member at a location laterally outwardly of the shank to define a limit of flexure movement for the wing member in the direction toward the free end.

Because of the relationship between the stop means and the wing member, the wing member can freely flex toward the head member during insertion in the workpiece opening. However, when an attempt is made to withdraw the fastener from the opening, the wing member and the stop means engage. This prevents flexure of the wing member in directions toward the free end. To withdraw the fastener it then becomes necessary to overcome the shear forces generated between the wing member, the stop means and the periphery of the workpiece opening. It should be apparent that the shear forces encountered with this arrangement can be much greater than the flexure forces which would be encountered when withdrawing a prior art push-in fastener.

In addition to the above, it should further be apparent that the shearing forces required to be overcome during withdrawal can be selectively controlled by varying the thickness of the wing member. Simultaneously, it is possible to reduce the insertion flexure forces by thinning the connecting web between the body of the wing member and the shank.

In accordance with a further and somewhat more limited aspect of the invention, the fastener preferably includes a plurality of the wing members positioned in axial spaced alignment along the shank to permit the fastener to be engaged with workpieces of varying thickness. Also it is preferred that the stop means comprise rigid abutments located between adjacent wing members. The abutments can be an integral portion of the shank, if desired.

In accordance with another aspect of the invention, the maximum lateral extent of the stop means is less than the maximum lateral extent of the wing members.

As is apparent from the foregoing, a primary object of the invention is the provision of a push-in fastener wherein the force required for removal is significantly greater than the force required for insertion.

A further object of the invention is the provision of a fastener of the type described wherein the flexible tabs or wing members are interrelated with stop means which prevent flexing of the tabs or wing members in a direction toward the free end of the fastener shank.

Another object is the provision of a one-piece, push-in fastener wherein the relationship between push-in and removal forces can be readily varied by making only slight changes to the fastener.

The above and other objects will become apparent from the following description when read in conjunction with the accompanying drawings wherein:

FIG. 5 is a view like FIG. 4 but showing the fastener fully installed and axial withdrawal forces being applied thereto;

FIG. 6 is an enlarged partial side elevational view showing the wing elements and their associated stop members in detail;

FIG. 7 is a side elevational view of a second embodiment of the invention; and,

FIG. 8 is a view taken on line 8—8 of FIG. 7.

Figure 1:
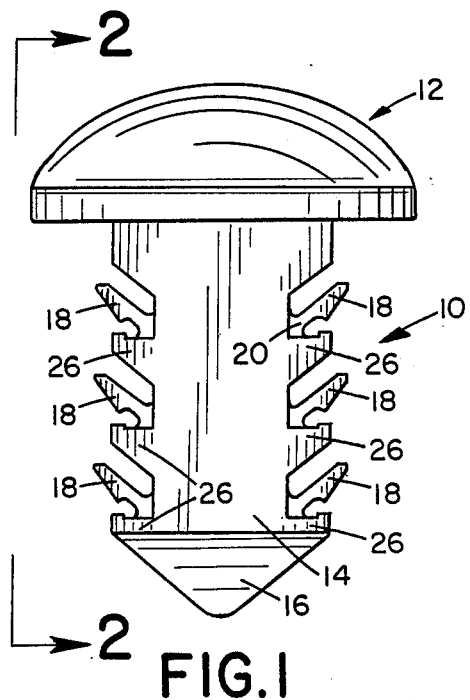
FIG. 1 is a side elevational view of a preferred embodiment of the subject invention.

Referring more particularly to the drawings wherein the showings are for the purpose of illustrating preferred embodiments of the invention only, and not for the purpose of limiting same, FIG. 1 shows the overall construction of a suitable one piece, push-in or drive type fastener 10. The fastener 10 is preferably injection molded from plastic and comprises an enlarged head portion 12 which has a relatively rigid elongated shank 14 extending axially therefrom. The shank terminates in a free end 16 which preferably has a tapered or pyramidal shape as shown. The head portion 12 is illustrated as being an enlarged, somewhat dome shaped head member having a radial extent significantly greater than the transverse dimensions of the shank 14. It should be apparent, however, that for the purposes of the subject invention, the head portion can be of any of a multiple number of styles or shapes, or it could comprises a separate component such as a wiring harness, fuel line clamp, or a separate structural element. Consequently, the term head portion merely refers to some component to which the shank 14 is connected for the purpose of joining such component to a subjacent workpiece.

Figure 4:
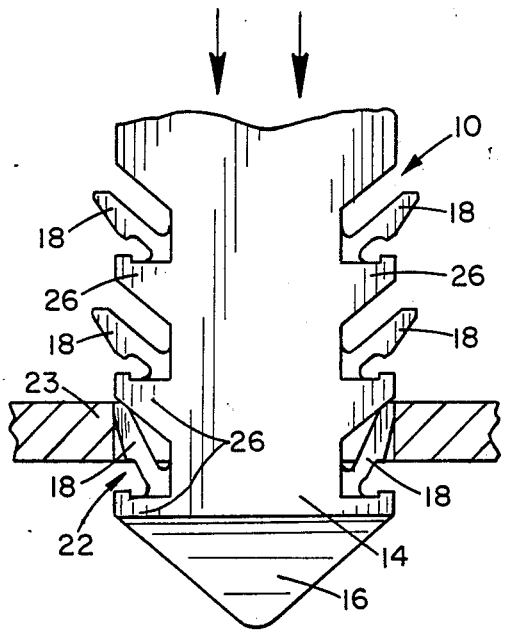
FIG. 4 is a partial side elevational view similar to FIG. 1 but showing the fastener being inserted into a preformed opening in a workpiece.
Figure 3:
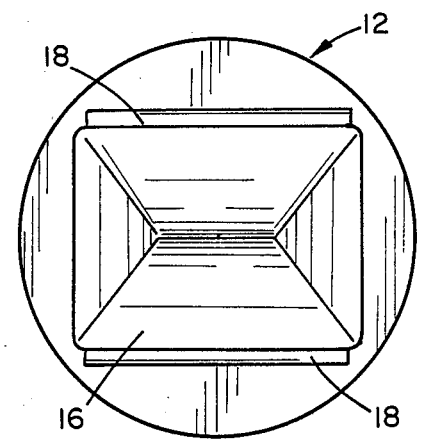
FIG. 3 is an end view taken on line 3—3 of FIG. 2.

The fastener 10 is specifically arranged and intended for mounting in a preformed opening in a workpiece. In the particular embodiment illustrated the shank 14 is of a generally rectangular cross-sectional shape, and accordingly, is intended to preferably be used in a rectangular opening 22 as illustrated in FIG. 4. Preferably, and for reasons which will subsequently become apparent, the shank 14 is sized so that it is freely receivable in the preformed opening with which the fastener is intended to be used.

Figure 2:
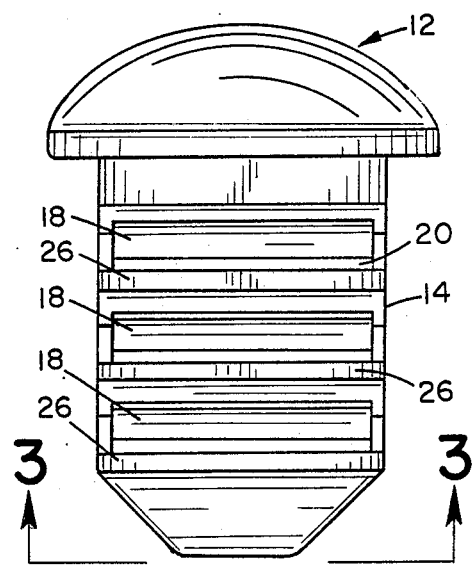
FIG. 2 is a view taken on line 2—2 of FIG. 1.

Associated with the shank 14 are a plurality of tabs or wing members 18 which, as shown in FIG. 2, extend substantially completely across the opposite side faces of shank 14. The wing members 18 extend laterally from the shank 14 but are preferably inclined somewhat toward the head portion 12 as illustrated. Each of the wing members 18 are preferably formed integrally with the shank 14 and are connected thereto by a hinge means in the form of a relatively flexible and resilient web portion 20 which is arranged to permit the associated wing member to have the ability to flex toward and away from the head portion 12 in directions axially of the shank 14.

As best illustrated in FIG. 4, the wing members 18 have a maximum lateral extent in their normal or unflexed position which is significantly greater than the spacing of the lateral sides of the preformed opening 22 in workpiece 23. In addition, it should be noted that the wing members are preferably positioned in sets which are axially aligned and spaced along the length of the shank 14. Consequently, during installation of the fastener 10 in the preformed opening 22 the individual wing members 18 in each of the two sets must be deflected and flexed axially of the shank 14 in a direction toward the head portion 12. As noted earlier, the rigid shank 14 must have a cross-section which is at least smaller than the cross-section of the opening 22. During insertion of the fastener, 10 the wing members 18 are successively deflected as the fastener is driven through the opening 22. Once the fastener has been driven to the desired depth as dictated by the thickness of the workpiece and the thickness of any additional member being connected between the head and the top of the workpiece, the fastener cannot be withdrawn from the opening 22 unless the wing members are deflected in a reverse direction toward the free end 16.

The general overall arrangement thus far described in typical of many prior art push-in type fasteners. The general arrangement is illustrated, for example, in U.S. Pat. Nos. 3,810,279 and 4,728,238. As can be appreciated, the force required to insert such fasteners is closely related to the force required to deflect the wing members 18. Similarly, the forces resisting withdrawal or removal of the fastener are likewise normally related directly to the force required to flex the wing members toward the free end of the shank. Attempts have been made in the prior art to increase the force required to deflect the wings toward the free end by varying the shape and design of the individual wing members or their connection to the shank. The subject invention, however, uses an arrangement wherein the forces required to withdraw a fastener are drastically increased by shifting the forces encountered from flexure forces to shearing forces. More particularly, and referring again to FIGS. 1 through 4 and 6, the individual wing members 18 are each associated with stop means which engage the wing members at a point outwardly of the shank when an attempt is made to bend or flex the wing members in a direction toward the free end of the shank. Specifically, each of the wing members 18 has a stop means in the form of a rigid abutment member 26 associated therewith. As shown in FIG. 1, an abutment member 26 is located subjacent each of the ring members 18 at a location such that an attempt to flex the associated wing member toward the free end causes engagement between the abutment member and the wing member to prevent such flexure beyond a limit point located approximately at the location wherein the wing members have their maximum lateral extent. Preferably, as illustrated in FIG. 6, each of the abutment members 26 is formed integrally with the shank 14 and extends outwardly a distance less than the cross-sectional dimension of the opening 22. That is, the abutments do not interfere with insertion of the fastener into the preformed opening.

The abutments 26 have an inclined lower face and are shaped to have substantial rigidity against axial flexure. A stop surface 28 is located on the upper face of each abutment 26 to engage a corresponding stop surface 30 formed on the underside of each of the wings 18. As noted earlier, the wings 18 are preferably provided with a web section 20 to allow them to have significant flexibility in directions axially of the shank 14. By varying the thickness of the web section 20 the flexibility can be varied. Additionally, by varying the thickness D of the wing member 18 the ability of the wing to resist shearing forces encountered during attempted extraction of the fastener can be varied. It should also be recognized that the underface of the abutments 26 and the next subjacent wing member 18 are designed and related such that the wing member 18 can flex freely in a direction toward the head portion such that it lies within the maximum radial extent of the abutment members 26. This permits the insertion operation to take place as shown in FIG. 4.

FIG. 5 illustrates the subject fastener when an attempt is made to withdraw it from the preformed opening 22. As illustrated therein the set of wing members 18 which is adjacent the workpiece 23 is caused to engage on the underside of the workpiece. During this engagement they are flexed in direction toward the free end 16. During this flexure the underside of the upper wings 18 engages with the next subjacent stop member 26 preventing further flexure movement. Because of the relationship between the stop members and the associated wing member further flexure movement is prevented and the withdrawal of the fastener can take place only by shearing the wing member 18 at its thickest and heaviest position or location. By varying this thickness it is, of course, possible to vary the forces to which the fastener must be subjected to produce fastener extraction. As is apparent the resulting fastener thus can have a widely varying difference in the relationship between installation forces and extraction forces. More particularly, as noted, these forces can be selectively varied merely by varying the thickness of the hinge or web portion 32 relative to the wing dimension D.

FIG. 7 and 8 show a modified form of the invention. In the FIGS. 7 and 8 embodiment, like reference numerals differentiated by a prime (') suffix have been used to identify corresponding elements. A description of a FIG. 1 through 4 element is to be considered as equally applicable to the corresponding element of FIGS. 7 and 8 unless otherwise noted. In particular, the embodiment of FIGS. 7 and 8 is arranged to allow the fastener to be able to tightly engage and hold a wider range of workpiece thicknesses. In this regard, the FIGS. 7 and 8 embodiment provides two series of tab members on each opposed lateral face of the shank 14'. More particularly, as shown in FIG. 8, a first series 40 extends along the left hand side of the illustrated face and a second series 41 extends along the right hand side. The two series 40 are separated by a vertical groove 42. As noted, the left hand series of wing members 18' and abutments 26' are vertically offset a small amount from the right hand series 41. The opposed face of the shank 14' similarly includes an offset series of wing members and abutments. Preferably, the offset is such that the wing members of one series are intermediate those of the adjacent series on the same side. Preferably, each series 40, 41 is in alignment with one of the series on the opposed face. Thus, irrespective of the particular thickness of the workpiece, relatively firm engagement can be achieved because of the close variation in positions of the tab members from the undersurface of the head portion 12'.

The invention has been described in great detail sufficient to enable one of ordinary skill in the art to make and use the same. Obvious modifications and alterations will occur to others upon a reading and understanding of the subject specification. It is intended to include all such modifications and alterations as part of the invention insofar as they come within the scope of the appended claims.

What is claimed is:

1. A push-in fastener for use in a preformed rectangular opening in a workpiece comprising:
   an elongated rigid shank with a central axis and terminating in a free end, said shank having a rectangular cross-sectional shape in planes perpendicular to said axis which is sized for free receipt in said preformed opening;
   a series of wing members formed integrally with said shank and extending laterally therefrom in axially spaced relationship aligned along a first flat side of said shank, said wing members having a terminal end extending parallel to the first side of said shank and being joined to said shank by hinge means comprising a thin web section which can freely flex along a line parallel to the first side of said shank for permitting flexure movement of said wing members in directions axially of said shank; and,
   stop means comprising rigid projections extending outwardly from said shank and positioned between adjacent ones of said wing members for engaging an associated wing member along a line parallel to the first side of said shank and laterally outwardly of said hinge means and said shank at a point of maximum thickness of said associated wing member and limiting flexure movement of said wing members in directions toward said free end when said wing members are in their position of maximum lateral extent.

2. The push-in fastener as defined in claim 1 wherein the maximum lateral extent of said rigid elements is less than the maximum lateral extent of said wing members.

* * * * *